Patented June 20, 1939

2,162,904

UNITED STATES PATENT OFFICE 2,162,904

SPRAY OIL COMPOSITION

John Raymond Allison, Whittier, Calif., assignor, by mesne assignments, to Union Oil Company of California, Los Angeles, Calif., a corporation of California No Drawing. Application December 24, 1934, Serial No. 759,069

11 Claims. (Cl. 167—43)

This invention relates to spray oils and emulsions produced from such oils which are particularly adapted for agricultural and horticultural uses to control or exterminate insects, scale, fungi and similar pests of plants, trees, foliage, fruit and the like, and relates particularly to oils and emulsions prepared from petroleum oils.

For a number of years it has been the effort of horticulturists to produce non-phytocidal spray oils which may be readily emulsified to adapt them for purposes of application by spray and which will readily break down upon contact with fruit and foliage to spread freely thereover in order to exert maximum insecticidal action. In general these efforts have not been wholly satisfactory, and the object of this invention is to produce spray oils which possess all of the desired characteristics above mentioned.

In attempting to attain these ends, I have discovered that a non-phytocidal petroleum spray oil may be blended with certain soaps which are especially stable in the oil and will at the same time act as emulsifying agents, and that certain stabilizing preparations may be added to such oil, or to an emulsion thereof, to stabilize the resultant emulsion and to assist spreading of the oil readily not only upon foliage of the tree or plant but also upon the fruit and upon the pests infesting the fruit, foliage and wood. The employment of such a stabilizer in conjunction with the emulsifiable oil produces an emulsion superior to anything heretofore employed for these purposes, both from the standpoint of stability and spreading qualities.

The invention may be stated rather briefly as residing in a phytonomic non-phytocidal petroleum spray oil containing an emulsifier both soluble and stable in the spray oil and here termed an "internal emulsifier", in combination with a stabilizer for a resultant emulsion with water, wherein the stabilizer contains another emulsifier termed an "external emulsifier" and constituents comprising a good leaf spreader and a good fruit spreader especially one having a buffer action. A buffer may be defined as an agent which hinders the action of inorganic salts in precipitating out materials which are added to the oil or stabilizer to insure attainment of the desired result. The internal emulsifier is defined as one contained in the oil and having the function of dispersing the oil in water. The external emulsifier is defined as one initially contained in the aqueous or non-oil constituent constituting the stabilizer, this external emulsifier being provided to aid the internal emulsifier in dispersing the oil in water.

The internal emulsifier contained in the spray oil will be a water-soluble fatty acid soap or fatty acid ester of a polyhydric alcohol, together with some free fatty acid. Preferably triethanolamine oleate together with a small excess of oleic acid is used. Equivalent emulsifiers may be employed, such as other fatty acid compounds or compositions stable in the oil and at least partly soluble therein and containing a quantity of free fatty acid, especially where such cooperates with the constituents of the external emulsifier to produce a high degree of emulsification. These equivalent emulsifiers include the water-soluble soaps of fatty acids, such as the other ethanolamine soaps, alkaline salts of sulfonated castor oil, as well as other fatty acid compounds having the prescribed functions including the fatty acid esters of polyhydroxyl alcohols, such as "diglycol oleate" and the like, together with a small excess of fatty acid to produce the desired stability.

In the stabilizer a water-soluble resinate may be employed as the agent which causes the oil to spread readily over the leaves upon application of the emulsion thereto, and an animal protein material, such as albuminate or albumen or casein or caseinate may be employed as the fruit spreader and buffer, these two together serving the necessary function of adequate spreading upon plant life as well as upon pests such as scale and the like. The external emulsifier which tends especially to aid the internal emulsifier and stabilize resultant emulsions, is preferably a water-soluble soap of a fatty acid and more particularly ammonium oleate and a small excess of free ammonia or similar alkaline material.

It is also within the invention to omit the fatty acid compounds from the oil in some instances and to introduce only oleic acid or other fatty acid into the oil to which the stabilizer is to be added. The invention also includes a spray oil base comprising a non-phytocidal petroleum spray oil containing triethanolamine oleate and a small excess of oleic acid.

The soap in the spray oil preferably approximates around 1% to 1½% of the oil, or the percentage may be larger, and the stabilizer (which may contain roughly equal proportions of the three agents mentioned) may be employed in amounts equal to about 5% of the oil, said oil and stabilizer being employed to prepare emulsions with water according to any usual or preferred practice, for example 85% to 90% emulsion. The stabilizer may, if desired, be originally prepared in the dry form in which the desired alkalinity may be provided through the medium of sodium carbonate instead of the excess ammonia mentioned. The 85% or 90% emulsion mentioned represents a concentrated emulsion as prepared for market. For use this will be greatly diluted with water according to standard practice, for instance to an oil content of 1% or 2%.

In preparing spray oils and emulsions according to this invention, any sufficiently non-phytocidal petroleum spray oil or any other oil suitable for use on plant life may be employed. A standard example is found in the highly refined light petroleum oil commonly found on the market having a De Ong value of 90 or unsulfonatable residue of 90%. (De Ong value is defined as the unsulfonatable percentage of residue of an oil according to the test given in "Industrial and Engineering Chemistry", vol. 18, 1926, page 175. Briefly stated, the oil is treated with sulfuric acid exactly 37 normal (100%) in a water bath of 95 to 100° C., around 210 to 212° F., for one hour. 20 c. c. of the above acid are added in two portions to 5 c. c. of oil in a Babcock cream test bottle and the mixture agitated every ten minutes during the hour. After phase separation the percentage of unsulfonated residue is the De Ong value.) Such an oil or other non-phytocidal oil is blended with 1% to 2% of a soap composition or equivalent stable in the oil and soluble or partly soluble therein, and constituting an internal emulsifier. This may be any oil-soluble soap from polar compounds such as the fatty acids. A preferred soap is triethanolamine oleate and it is desirable that there be present a small excess of the fatty acid (oleic). Preferably this oleate is produced by saponification of triethanolamine with excess oleic acid in the presence of the spray oil. In other words, triethanolamine and oleic acid are added to the spray oil and the saponification effected therein.

As an example of a desirable procedure, one-half percent by weight of triethanolamine was added together with one percent by weight of oleic acid to the spray oil. This represents an oleic acid excess of about 10% which is desirable in conjunction with the stabilizer to produce a stable emulsion. This excess acid apparently reacts with or is reacted upon by some of the constituents of the stabilizer with the result that the soap in the oil and the ingredients of the stabilizer produce the unitary composition which renders emulsification more complete and maintains the emulsion in a more stable form up to the time that it is deposited upon the tree, fruit or plant.

The stabilizer which is added to the oil to stabilize the emulsion, not only performs the function above indicated of taking up the free fatty acid, producing complete emulsification and rendering the emulsion more stable, but also serves to insure good spreading of the oil upon leaf, fruit and wood when the oil is deposited. The stabilizer comprises an agent to insure good spreading on foliage, an agent to insure good spreading upon fruit, which preferably is also a buffer, and an external or outside emulsifier. As a leaf spreader, a water-soluble resinate, such as potassium resinate is preferably employed, and as a fruit spreader and buffer an albumen or an albuminate or a caseinate is preferred, and the external emulsifier is an alkali soap of a fatty acid, preferably an ammonia soap and in particular ammonium oleate. It is desirable that this stabilizer be slightly alkaline and for best results such excess alkalinity is necessary. The stabilizer may be made up as a solution containing for example 50% to 90% water and about ½% excess ammonia as ammonium hydroxide based on the stabilizer constituents; or it may be made up dry in which about ½% of sodium carbonate will be employed to provide the alkalinity. In general it may be said that the resinate, the oleate, and the albumen, albuminate or caseinate may be used in approximately equal proportions; however the proportions of about 25% resinate, 35% oleate and 40% of albumen, albuminate, caseinate or equivalent, are preferable, the ½% or other slight excess of alkaline material of course being added. These proportions may be varied to the extent of possibly about 20% or 25% of each, either more or less than the amount indicated, but approximately the indicated amounts are deemed preferable in most instances.

As a specific example of a stabilizer prepared according to this invention I have used the following:

| | Per cent |
|---|---|
| Potassium resinate obtained as a potassium salt of rosin (colophony), or rosin oil, i. e. predominantly the potassium of abietic acid | 26½ |
| Ammonium oleate | 32 |
| Albumen | 41 |
| Ammonium hydroxide | ½ |

The resinate may in some instances be replaced with additional ammonium oleate, where the corresponding reduction in efficiency is not objectionable. This stabilizer is made up in water solution with a quantity of water, for example 75%. No particular difficulty is encountered in obtaining the solution, ordinary addition and agitation being sufficient. If desired, the stabilizer may be prepared in dry form in which approximately ½% of ammonium hydroxide will be replaced with an equivalent of dry sodium carbonate, as previously stated.

The spray oil with its triethanolamine soap content, and the stabilizer as above described, may be combined in various ways with water to produce a concentrated emulsion for marketing purposes or the weak emulsion for spraying. The oil with its soap content and stabilizer are maintained separate until the emulsion is to be prepared. In practice, the emulsion may be prepared and used promptly, or a concentrated emulsion may be originally prepared and used at some subsequent date. Preparation of emulsion for use can be accomplished by adding to the spray oil containing the triethanolamine soap and excess fatty acid, about 10% or 15% (with limits between about 5% to 20%) of its volume of the stabilizer if in solution, or equivalent if in dry form. This mixture will then be combined with water to produce about an 85% or 90% emulsion, i. e. "concentrated emulsion' containing 10 or 15% water. Such emulsion is obtained by very mild agitation, and complete distribution may be maintained by continued mild agitation. The more concentrated emulsion having been prepared, it is subsequently diluted with water or added to water to produce any desirable spraying concentration, for example 1% or 2% of spray oil in the water.

Mild agitation maintains perfect distribution during spraying operations. Upon contact with leaf, wood or fruit of the tree or the plant, the emulsion readily breaks and the oil promptly spreads itself over the leaves, fruit and wood as well as scale or other pest to be eradicated.

However, the stabilizer may be introduced into a quantity of water, and the oil then added to make the concentrated emulsion which will readily result upon reasonable agitation. Likewise the oil may be first agitated in the water and the stabilizer then added with further agitation, or all of these may be commingled simultaneously. Any of these concentrated emulsions are then amenable to such dilution as desired. As is well understood, the preparation of concentrated emulsion, which is thereafter diluted, is preferable because easier, but the entire amount of water could be initially used by prolonging agitation until the desired emulsion is obtained.

Proportions and concentrations of a desirable nature have been outlined above. Percentages of soap making materials added to the spray oil are indicated in desirable proportions. These may, if desired, be considerably increased, although without particular advantage, and may be somewhat decreased. The excess of oleic acid indicated is sufficient, but it could be increased to a point where perhaps only half of it is reacted with the triethanolamine. The proportions and indicated variation of the agents in the stabilizer represent a very wide range which is permissible with good results. However it is not desirable to reduce the ammonium oleate greatly below one-third of the stabilizer content because ammonium oleate is an important aid to emulsification and substantial reduction thereof renders emulsification somewhat difficult, although such can be overcome by increased agitation. Where the dry form of stabilizer is marketed, water may be added thereto in comparatively small quantities to obtain solution before addition to the oil, although this is not necessary.

As a substitute for triethanolamine oleate, similar oleates which blend with and are stable in the oil may be employed such as the other ethanolamine oleates to which also excess fatty acid may be added. In general, all non-metal and alkali-metal fatty acid compounds, which act as emulsifiers and are stable in the oil and at least partly soluble in the oil, may be employed. Preferably all of these should contain a small excess of fatty acid in order to obtain optimum results. These compounds include the water-soluble soaps of organic bases and the alkali metals. They also include the mono- and di- substituted fatty acid esters of polyhydroxyl alcohols, such as diglycol oleate (di-ethylene glycol oleate) mono-glycol oleate, glycerol mono-oleate and glycerol di-oleate. Other non-metal fatty acid compounds within this definition are the other ethanolamine soaps, e. g. the mono- and di-ethanolamine soaps of the fatty acids and alkaline salts of sulfonated castor oil. The anhydrous sodium and potassium oleates may be used in some instances with fairly satisfactory results, and likewise the anhydrous sodium naphthenates and ammonium oleate. Also various mixtures of these materials may be employed such as tri-ethanolamine oleate with di-glycol oleate. In each instance the excess fatty acid previously indicated preferably should be used. The excess fatty acid causes an additional quantity of soap to be formed when the free ammonia of the stabilizer is introduced in the preparation of the emulsion which seems to have the function of blending the constituents more thoroughly and aiding emulsification. Similarly, in the preparation of these emulsifier other fatty acids or mixtures of fatty acids of appropriate characteristics might be substituted for the oleic acid ($C_{18}H_{34}O_2$), such as palmitic ($C_{16}H_{32}O_2$), linoleic ($C_{18}H_{32}O_2$), and other saturated and unsaturated fatty acids running down the scale of molecular weights to and including lauric acid ($C_{12}H_{24}O_2$). As mixtures of such acids coconut and palm-kernel oils may be used. However, of the natural oils palm oil appears to be the most satisfactory. Palm-kernel oil according to various authorities contain about 50% lauric acid and around 15% of myristic ($C_{14}H_{28}O_2$) and oleic acids, while coconut oil contains about 45% lauric and 20% myristic acids, these two oils containing considerable amounts of acids lighter than oleic acid. Palm oil contains around 45% each of palmitic and oleic acids, the rest being chiefly heavier than palmitic acid. In general, however, commercial oleic acid is preferred.

It is pointed out that, for best results, the internal emulsifier selected should be anhydrous or substantially anhydrous, since distribution in the oil is thereby more readily accomplished.

Of the various soaps indicated, the oleate of triethanolamine is especially desirable. Thus, while ammonium oleate can be substituted in some instances for the triethanolamine oleate this is not ordinarily a preferable procedure because the resultant emulsion is not so stable, possibly because the ammonium oleate itself is not so stable in the oil.

While the use of the triethanolamine soap alone will tend to form an emulsion when the oil is agitated with water, and while the stabilizing agent containing the water-soluble resinate and protein spreaders and a soap if added to the oil without the triethanolamine soap would also tend to produce an emulsion of the oil and water, it is pointed out nevertheless that it is only when both of these agents are employed together in the manner above described that a highly stable emulsion is formed and it is only under these conditions that a stable emulsion may be easily produced, that is, with a minimum of agitation. From these facts it will be apparent that the conjoint use of the stabilizing agent with the triethanolamine soap or equivalent in the oil produces vastly different and highly superior results over any independent use of the agents mentioned, and in addition to these functions the emulsion is one which is quick-breaking and quick-spreading and highly efficient for all purposes intended.

Instead of the albumen, casein, caseinate or albuminate, other animal protein materials or vegetable protein materials such as okra gum, having like capacities to serve as spreader and buffer, may be employed. The ammonium and sodium resinates or similar water-soluble resinates are to be included along with potassium resinate as the other type of spreader.

It is to be understood that the disclosures herein given are merely illustrative of the generic invention and are not to be taken as limiting inasmuch as various modifications by those skilled in the art may be made within the scope of the claims.

I claim:

1. A spray oil composition resulting from combining a mineral spray oil containing non-phytocidal emulsifying soap of saponifiable organic acid, said soap being at least partly soluble in the oil and also at least partly soluble in water, and a quantity of uncombined oil-soluble non-phytocidal saponifiable organic acid, with water and with a spreader in the form of water-soluble protein material and excess free alkali adapted to combine with said uncombined saponifiable organic acid to yield water-soluble soap.

2. A spray oil composition resulting from combining a mineral spray oil containing a fatty acid emulsifier compound at least partly soluble in the oil and also at least partly soluble in water and a small amount of free fatty acid with a spreader and buffer in the form of a water soluble protein compound and a small excess of free alkali.

3. A spray oil preparation produced by combining a mineral spray oil containing a quantity of a fatty acid emulsifier compound at least partly soluble in the oil and at least partly soluble in water and a small excess of a fatty acid with a stabilizer comprising a water-soluble-protein spreader, a water-soluble soap, and a small excess of alkali.

4. An oil according to claim 3 wherein the fatty acid emulsifier is an ethanolamine soap.

5. An oil according to claim 3 wherein the fatty acid emulsifier is a water-soluble soap.

6. A spray oil preparation resulting from combining a mineral spray oil containing a quantity of a water and oil-soluble fatty acid soap stable in the oil and a small excess of a fatty acid with a stabilizer containing a water-soluble protein material and a water-soluble resinate as spreaders, a water-soluble soap of a fatty acid, and a small excess of alkali.

7. A method for the manufacture of a spray oil comprising dissolving in a mineral spray oil an emulsifier stable in the oil and at least partly soluble in water in the form of a soap of an oil soluble fatty acid together with a small excess of fatty acid, the emulsifier approximating 1% to 2% of the oil, adding water and a stabilizer containing a water-soluble resinate, a water-soluble protein material to serve as a buffer and spreader, a water-soluble alkali soap of a fatty acid and a small excess of alkali, the proportions in the stabilizer approximating 25% resinate, 35% alkali soap and 40% protein material.

8. A method for preparing a spray oil composition comprising combining a mineral spray oil containing "diglycol oleate" and an excess of fatty acid with a stabilizer containing a water-soluble soap, a water-soluble protein material and an excess of free alkali.

9. A method for manufacturing spray oil comprising commingling a mineral spray oil with an oil-soluble and water-soluble fatty acid emulsifier stable in the oil together with a small quantity of free fatty acid and adding thereto water, a water-soluble fatty acid soap, a water-soluble protein material and an excess of alkali to combine with said free fatty acid.

10. A method for manufacturing a spray oil composition comprising commingling a mineral spray oil with an oil-soluble and water-soluble fatty acid emulsifying agent stable in the oil, together with a small excess of fatty acid, and adding thereto a water-soluble fatty acid soap, an excess of alkali, and a spreader of the class consisting of water-soluble resinates and water-soluble protein materials.

11. A spray oil emulsion especially adapted for horticultural spraying, produced by combining water with two units in the form of a soluble-oil unit containing non-phytocidal mineral spray oil, a fatty acid soap soluble both in the mineral oil and in water, and excess fatty acid soluble in the oil, and a second unit containing a water-soluble emulsifier soap, a water-soluble spreader from the class consisting of resinates, and water-soluble protein materials, free alkali and water, the product being a uniform, stable, fine emulsion which breaks readily when applied to foliage and yields a uniform, thin oil film free from toxic materials, the added non-oil constituents largely passing off in the water.

JOHN R. ALLISON.

---

CERTIFICATE OF CORRECTION.

Patent No. 2,162,904. June 20, 1939.

JOHN RAYMOND ALLISON.

It is hereby certified that error appears in the printed specification of the above numbered patent requiring correction as follows: Page 2, second column, line 28, in the table, after the word "potassium" insert salt; page 3, second column, line 11, for "contain" read contains; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.

water and with a spreader in the form of water-soluble protein material and excess free alkali adapted to combine with said uncombined saponifiable organic acid to yield water-soluble soap.

2. A spray oil composition resulting from combining a mineral spray oil containing a fatty acid emulsifier compound at least partly soluble in the oil and also at least partly soluble in water and a small amount of free fatty acid with a spreader and buffer in the form of a water soluble protein compound and a small excess of free alkali.

3. A spray oil preparation produced by combining a mineral spray oil containing a quantity of a fatty acid emulsifier compound at least partly soluble in the oil and at least partly soluble in water and a small excess of a fatty acid with a stabilizer comprising a water-soluble-protein spreader, a water-soluble soap, and a small excess of alkali.

4. An oil according to claim 3 wherein the fatty acid emulsifier is an ethanolamine soap.

5. An oil according to claim 3 wherein the fatty acid emulsifier is a water-soluble soap.

6. A spray oil preparation resulting from combining a mineral spray oil containing a quantity of a water and oil-soluble fatty acid soap stable in the oil and a small excess of a fatty acid with a stabilizer containing a water-soluble protein material and a water-soluble resinate as spreaders, a water-soluble soap of a fatty acid, and a small excess of alkali.

7. A method for the manufacture of a spray oil comprising dissolving in a mineral spray oil an emulsifier stable in the oil and at least partly soluble in water in the form of a soap of an oil soluble fatty acid together with a small excess of fatty acid, the emulsifier approximating 1% to 2% of the oil, adding water and a stabilizer containing a water-soluble resinate, a water-soluble protein material to serve as a buffer and spreader, a water-soluble alkali soap of a fatty acid and a small excess of alkali, the proportions in the stabilizer approximating 25% resinate, 35% alkali soap and 40% protein material.

8. A method for preparing a spray oil composition comprising combining a mineral spray oil containing "diglycol oleate" and an excess of fatty acid with a stabilizer containing a water-soluble soap, a water-soluble protein material and an excess of free alkali.

9. A method for manufacturing spray oil comprising commingling a mineral spray oil with an oil-soluble and water-soluble fatty acid emulsifier stable in the oil together with a small quantity of free fatty acid and adding thereto water, a water-soluble fatty acid soap, a water-soluble protein material and an excess of alkali to combine with said free fatty acid.

10. A method for manufacturing a spray oil composition comprising commingling a mineral spray oil with an oil-soluble and water-soluble fatty acid emulsifying agent stable in the oil, together with a small excess of fatty acid, and adding thereto a water-soluble fatty acid soap, an excess of alkali, and a spreader of the class consisting of water-soluble resinates and water-soluble protein materials.

11. A spray oil emulsion especially adapted for horticultural spraying, produced by combining water with two units in the form of a soluble-oil unit containing non-phytocidal mineral spray oil, a fatty acid soap soluble both in the mineral oil and in water, and excess fatty acid soluble in the oil, and a second unit containing a water-soluble emulsifier soap, a water-soluble spreader from the class consisting of resinates, and water-soluble protein materials, free alkali and water, the product being a uniform, stable, fine emulsion which breaks readily when applied to foliage and yields a uniform, thin oil film free from toxic materials, the added non-oil constituents largely passing off in the water.

JOHN R. ALLISON.

---

CERTIFICATE OF CORRECTION.

Patent No. 2,162,904.  June 20, 1939.

JOHN RAYMOND ALLISON.

It is hereby certified that error appears in the printed specification of the above numbered patent requiring correction as follows: Page 2, second column, line 28, in the table, after the word "potassium" insert salt; page 3, second column, line 11, for "contain" read contains; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.